United States Patent [19]

Osman

[11] Patent Number: 4,864,481
[45] Date of Patent: Sep. 5, 1989

[54] REGULATOR FOR ISOLATED CHASSIS POWER SUPPLY

[75] Inventor: Peter D. Osman, Indianapolis, Ind.

[73] Assignee: RCA Licensing Corporation, Princeton, N.J.

[21] Appl. No.: 926,031

[22] Filed: Oct. 31, 1986

[51] Int. Cl.$^4$ .................................... H02M 3/335
[52] U.S. Cl. ........................... 363/21; 363/97; 315/411
[58] Field of Search ............ 363/20, 21, 97, 131; 358/190; 315/411

[56] References Cited

U.S. PATENT DOCUMENTS

| | | | |
|---|---|---|---|
| 3,657,569 | 4/1972 | Froeschle | 307/275 |
| 4,318,165 | 3/1982 | Kornrumpf et al. | 363/21 |
| 4,524,411 | 6/1985 | Willis | 363/21 |
| 4,608,625 | 8/1986 | Josephson et al. | 363/21 |
| 4,628,429 | 12/1986 | Walker | 363/21 |
| 4,647,823 | 3/1987 | Luz | 315/411 |

FOREIGN PATENT DOCUMENTS 2079014A 1/1982 United Kingdom .

OTHER PUBLICATIONS

H. W. Ott, "Noise Reduction Techniques in Electronic Systems", 1976, p. 72.
J. Millman, "Microelectronics", 1979, p. 682.

Primary Examiner—Patrick R. Salce
Assistant Examiner—Kristine L. Peckman
Attorney, Agent, or Firm—Eugene M. Whitacre; Joseph J. Laks; Harvey D. Fried

[57] ABSTRACT

A switching-type power supply for a video apparatus includes regulating circuits that respond to both voltage and current information in order to generate pulse width modulated signals for the power supply switching device. The regulating circuits are electrically non-isolated from the output load circuits to provide direct feedback from one of the load circuit voltage supplies in order to effect accurate regulation of the supply voltage. Primary current flow information is provided via an electrically isolated winding such that all regulation circuitry is electrically nonisolated from the load circuit supplies.

1 Claim, 1 Drawing Sheet

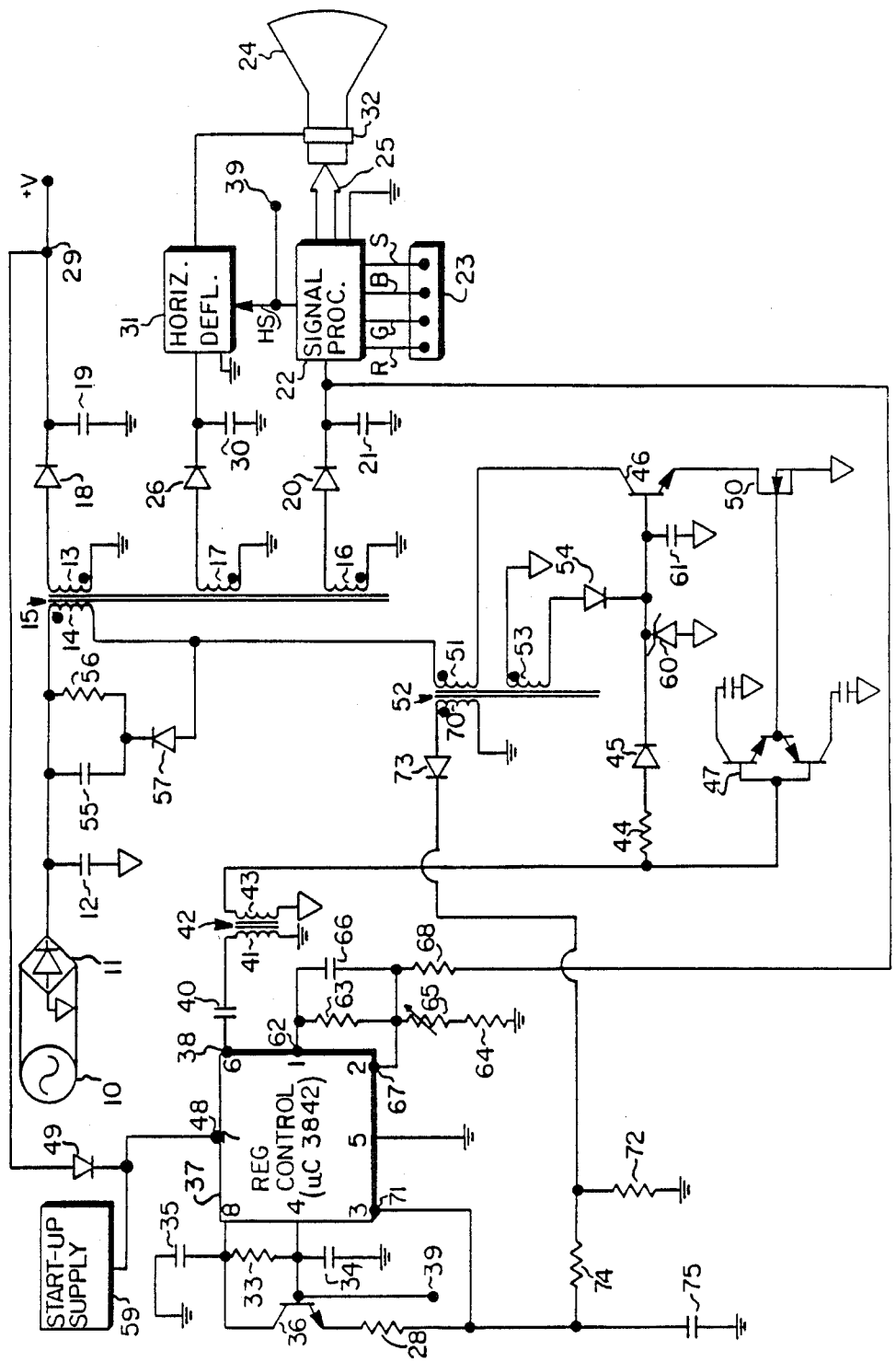

REGULATOR FOR ISOLATED CHASSIS POWER SUPPLY

This invention relates to video apparatus power supplies and, in particular, to power supplies that provide electrical isolation between the input voltage supply and the video apparatus load circuits.

Video apparatus, such as television receivers and computer monitors, for example, incorporate power supplies that produce one or more regulated voltage levels for powering various load circuits. These load circuits are typically incorporated within the video apparatus, but may be peripheral or external devices, such as a computer. The degree of regulation of the load circuit supply voltages that is required may be quite severe, particularly in the case of computer monitors. Monitors and television receivers that include provisions for direct video and audio input and output through user accessible terminals require some means for electrically isolating the input and output terminals from the AC power line. Electrical isolation may be effectively and economically accomplished by electrically isolating the AC line-connected primary winding of a power supply transformer from the user accessible load circuit-connected secondary windings. The conduction current in the primary winding is switched to effect regulation of the secondary winding-developed load circuit voltage supplies. With the power transformer being the isolating structure, it is not possible to directly couple a feedback signal from one of the secondary winding-connected load circuits to regulation or control circuitry that is connected to the primary winding of the transformer. In order to avoid the added cost and complexity of a feedback isolation device or structure, it is possible to provide load circuit supply regulation via feedback from the primary winding side of the power transformer. Primary side regulation, however, may make detection of load circuit faults or malfunctions more difficult than when load circuit feedback regulation arrangements are utilized.

In accordance with an aspect of the present invention, a power supply for a video apparatus comprises a source of unregulated voltage and a first winding coupled to and being energized from said source of unregulated voltage. A second winding is electrically isolated from the first winding and is energized in response to the energization of the first winding for providing power to a load. Circuitry is electrically isolated from the first winding and controls the energization of the first winding in response to first and second feedback signals for regulating the power supplied to the load. Circuitry is coupled to the second winding and to the control means for providing the first feedback signal. A circuit, including a third winding electrically isolated from the first winding, is coupled to the control circuit and provides the second feedback signal determined in response to the current flow in the first winding.

In the accompanying drawing, the sole FIGURE is a block and schematic diagram of a portion of a video apparatus including a power supply in accordance with an aspect of the present invention.

Referring to the FIGURE, there is shown a video apparatus, such as a television receiver or computer monitor, for example, in which a source of AC voltage 10, such as an AC line supply, is rectified by circuitry 11 and filtered by capacitor 12 to form a source of unregulated DC voltage that is applied to one terminal of a primary winding 14 of a power transformer 15. Current flow from the unregulated DC voltage source through primary winding 14 causes current to flow and voltages to be developed across secondary windings 13, 16 and 17 by transformer action.

The voltage developed across winding 13 is rectified by diode 18 and filtered by a capacitor 19 to produce a DC voltage at a terminal 29 illustratively having a level designated +V, which may be used to power various load circuits of the video apparatus.

The voltage developed across winding 16 is rectified by diode 20 and filtered by capacitor 21 to form a DC supply voltage that illustratively provides power to signal processing circuitry 22. Signal processing circuit 22 illustratively receives red, green, and blue (R, G, B) designated video signals, along with a synchronizing signal (S), via a user accessible input terminal 23, from an external signal source (not shown), such as a computer. Signal processing circuit 22 produces the red, green and blue color drive signals which are applied to the electron gun assembly (not shown) of a cathode ray tube (CRT) 24 via a conductor 25.

The voltage developed across winding 17 is rectified by a diode 26 and filtered by a capacitor 30 to form a DC supply voltage that is illustratively used to power a horizontal deflection circuit 31. Horizontal deflection circuit 31 produces a deflection signal that is applied to and produces a deflection current in a horizontal deflection winding, which forms part of a deflection yoke 32, located on the neck of CRT 24. Horizontal deflection circuit 31 is synchronized in operation by an appropriate horizontal or line rate synchronizing signal provided by signal processing circuit 22 via a conductor HS.

Transformer 15 provides electrical isolation between the line supply AC voltage source 10 and the secondary-connected user accessible load circuits, such as signal processing circuit 22. This isolation is indicated by the use of different ground symbols in the FIGURE.

The general operation of the power supply will now be described. The horizontal or line rate synchronizing signal on conductor HS is also applied via a terminal 39 to the synchronizing input of a regulator control circuit 37, which operates as a pulse width modulator. During start-up of the video apparatus before synchronizing pulses are available, the free running frequency of regulator control circuit 37 is established by resistor 33 and capacitor 34. Regulator control circuit 37 is illustratively shown as an integrated circuit having a type designation of uC 3842, manufactured by Unitrode. Representative pin numbers of this integrated circuit are shown within the outline of regulator control circuit 37. Capacitor 35 operates as a bypass capacitor. Transistor 36 and resistor 28 provide sync pulse slope compensation. Operating power for regulator control circuit 37 is provided from the secondary developed +V supply at terminal 29 to a power supply input terminal 48 of regulator control circuit 37 via a diode 49. During start-up of the video apparatus, before the +V supply is established, power is supplied to terminal 48 of regulator control circuit 37 from a start-up supply 59, which may be derived from the unregulated voltage supply through a number of conventional means.

The output of regulator control circuit 37 at terminal 38 is a pulse width modulated switching signal that is applied via coupling capacitor 40 to a winding 41 of a transformer 42, which provides electrical isolation between regulator control circuit 37 and circuitry that is nonisolated from AC line supply 10. The switching signal developed across winding 43 of transformer 42 is applied, via resistor 44 and diode 45, which establish a drive current level during start-up of the video apparatus, to the base of a transistor 46. The switching signal is also applied via push-pull drive circuitry 47 to the gate of a field effect transistor (FET) 50. Transistor 46 and FET 50 are connected in a cascode configuration. The switching signal from regulator control circuit 37 cause transistor 46 and FET 50 to switch conductive states. FET 50 switches conductive states in response to switching pulses from regulator control circuit 37 faster than transistor 46. Conduction of FET 50 will therefore aid in turning transistor 46 on and off by pulling the emitter of transistor 46 low to turn transistor 46 on and opening the emitter of transistor 46 to turn transistor 46 off. When transistor 46 is conducting, current flows from the unregulated DC source through primary winding 14, a winding 51 of a transformer 52, the collector-emitter path of transistor 46 and the drain-source path of FET 50 to ground. Secondary winding 53 of transformer 52 provides regenerative base current, in response to current flow in winding 51, via diode 54 for transistor 46 in order to quickly saturate transistor 46 and maintain it in saturation to reduce power dissipation. Capacitor 55, resistor 56 and diode 57 form a snubber circuit to absorb excess energy when transistor 46 is rendered nonconductive in order to reduce the amplitude of the voltage spike applied to transistor 46. Zener diode 60 and capacitor 61 act to remove base charge from transistor 46 when transistor 46 is rendered nonconductive.

The voltage levels of the DC voltages applied to signal processing circuit 22 and horizontal deflection circuit 31 are regulated by controlling the duty cycle of the output switching pulses of regulator control circuit 37, which in turn determines the conduction interval of transistor 46 and hence the current flow interval through primary winding 14. For a video apparatus that is used as a computer monitor, for example, it is necessary that the secondary or load circuit supply voltage be regulated to close tolerances. Such accurate regulation may be efficiently provided in part by the establishing of an output voltage related feedback signal from one of the load circuit supply voltages. In order to avoid the cost and complexity of an electrical isolating component, such as a transformer or an optocoupler, between the load circuit supply and the regulating circuitry, it is desirable to reference the load circuits and the regulating circuitry to the same ground potential, as shown in the FIGURE, such that they are nonisolated. The regulating circuitry must then be electrically isolated from the AC line voltage supply. With this arrangement, as shown in the FIGURE, the output voltage related feedback signal is derived from the voltage developed across secondary or load winding 16 and is directly applied to terminal 67 of regulator control circuit 37 via a feedback network comprising resistors 63, 64 and 68, variable resistor 65, and capacitor 66. The voltage related feedback signal developed from the secondary winding 16 regulates the output voltage with respect to variations in the load circuit requirements. Resistors 64 and 68, and variable resistor 65 form a voltage divider that establishes a voltage for the error amplifier input at terminal 67 of regulator control circuit 37. Variable resistor 65 adjusts the voltage level at which the output voltage is regulated. The output of the voltage control error amplifier internal to regulator control circuit 37 illustratively sets the positive reference voltage for one input of the current mode control circuitry of regulator control circuit 37.

In accordance with an aspect of the present invention, the negative input of the current mode control circuit of regulator control circuit 37 is illustratively provided by a signal representative of current flow in primary winding 14. This signal is derived from a winding 70 of transformer 52 and is applied, as will be described, to a terminal 71 of regulator control circuit 37. Winding 70 is electrically isolated from primary winding 14 yet is responsive to primary winding current through winding 51 of transformer 52. The current in winding 70, representative of primary winding current flow, establishes a voltage across resistor 72 via a diode 73. Resistor 74 and capacitor 75 form a low pass filter to remove noise spikes from the current-related feedback signal. As the primary winding current ramps up or increases, the voltage across resistor 72 reaches the positive reference voltage for the current mode control error amplifier and the output pulse driver is turned off, thereby controlling the pulse width of the output pulse at terminal 38. The current mode error amplifier is constructed so that the voltage at input terminal 71 cannot exceed 1.0 volt without the switching pulse being terminated. In this manner the primary current is limited to a level equal to the ratio of 1.0 volt divided by the resistance value of resistor 72. Overcurrent protection is thereby provided.

The previously described power supply regulator circuit provides both output voltage and primary winding current regulation. In accordance with a novel aspect of the present invention, the regulator control circuitry is electrically nonisolated from the secondary-connected output circuits, thereby providing direct feedback of output voltage information to the regulator circuits and affording very accurate regulation of the output supply voltages.

What is claimed is:

1. A power supply for a video apparatus comprising:
   a source of unregulated voltage;
   a first winding of a power transformer coupled to said source of unregulated voltage for being energized therefrom;
   a switch including a bipolar output transistor coupled to said first winding and electrically nonisolated therefrom for controlling the energization of said first winding in response to an input signal, an unramping current flowing in said first winding and in said transistor during conduction of said transistor;
   a second winding of said power transformer, electrically isolated from said first winding, and being energized in response to the energization of said first winding for providing power to a load;
   means electrically isolated from said first winding for providing a voltage feedback signal representative of an output voltage developed across said second winding;
   a first winding of a current transformer, electrically nonisolated from the first winding of said power transformer, and coupled in a current path of said unramping current;
   a second winding of said current transformer, electrically nonisolated from the first winding of said power transformer, and coupled to the base electrode of said bipolar output transistor for providing regenerative base current thereto;

a third winding of said current transformer, electrically isolated from the first winding of said power transformer, for providing a current feedback signal representative of said unramping current; and current mode regulator control means, electrically isolated from said first winding, and responsive to said voltage feedback signal and to said current feedback signal for generating said input signal for said switch to regulate said output voltage in accordance with current mode control of the conduction of said switch.

* * * * *